US007775699B2

(12) United States Patent
Fallahi et al.

(10) Patent No.: US 7,775,699 B2
(45) Date of Patent: Aug. 17, 2010

(54) PROJECTOR LAMP HAVING ENHANCED LOW TO HIGH BEAM CONTRAST RATIO

(75) Inventors: Amir P. Fallahi, West Bloomfield, MI (US); William C. Ince, Novi, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 491 days.

(21) Appl. No.: 11/496,928

(22) Filed: Jul. 31, 2006

(65) Prior Publication Data

US 2008/0025035 A1 Jan. 31, 2008

(51) Int. Cl.
*B60Q 1/00* (2006.01)
*F21V 17/02* (2006.01)

(52) U.S. Cl. ....................... 362/539; 362/507; 362/509; 362/512; 362/513; 362/538; 362/546; 362/351

(58) Field of Classification Search ................ 632/539, 632/512–513

See application file for complete search history.

(56) References Cited

U.S. PATENT DOCUMENTS

| | | | | |
|---|---|---|---|---|
| 953,332 | A | 3/1910 | Harris | |
| 1,625,660 | A | 4/1927 | Homyer et al. | |
| 1,834,542 | A | 12/1931 | Karlebo | |
| 5,113,319 | A | 5/1992 | Sekiguchi et al. | |
| 6,059,435 | A | 5/2000 | Hamm et al. | |
| 6,186,651 | B1 | 2/2001 | Sayers et al. | |
| 6,312,147 | B2 * | 11/2001 | Eichler | 362/539 |
| 6,607,295 | B2 | 8/2003 | Hayakawa | |
| 6,874,923 | B2 | 4/2005 | Albou et al. | |
| 6,976,775 | B2 * | 12/2005 | Koike | 362/545 |
| 7,008,093 | B2 | 3/2006 | Fukawa et al. | |
| 7,364,333 | B2 * | 4/2008 | Kurz et al. | 362/539 |
| 2001/0021113 | A1 | 9/2001 | Eichler | |
| 2002/0085387 | A1 | 7/2002 | Taniuchi | |
| 2002/0122310 | A1 * | 9/2002 | DiPenti et al. | 362/512 |
| 2003/0072164 | A1 * | 4/2003 | Watanabe et al. | 362/465 |
| 2004/0213012 | A1 * | 10/2004 | Fukawa et al. | 362/539 |
| 2005/0122734 | A1 * | 6/2005 | Foust et al. | 362/539 |
| 2005/0152151 | A1 | 7/2005 | Lisowski et al. | |

FOREIGN PATENT DOCUMENTS

| | | |
|---|---|---|
| JP | 60135342 | 7/1985 |
| JP | 62131836 | 6/1987 |

* cited by examiner

*Primary Examiner*—Sandra L O'Shea
*Assistant Examiner*—Sean P Gramling
(74) *Attorney, Agent, or Firm*—Brinks Hofer Gilson & Lione

(57) ABSTRACT

A bifunctional vehicle headlamp is described. In one embodiment, a headlamp comprises a light source and a reflector, which cooperate to form a light pattern, a lens positioned forward of the reflector and configured to project a desired beam pattern, and a light shield disposed between the lens and the reflector. The light shield has a first shade that selectively blocks a first portion of the light pattern to form a first beam pattern, and a second shade that selectively blocks a second portion of the light pattern to form a second beam pattern.

16 Claims, 5 Drawing Sheets

PROJECTOR LAMP HAVING ENHANCED LOW TO HIGH BEAM CONTRAST RATIO

TECHNICAL FIELD

The present invention relates generally to headlamps for motor vehicles, and in particular to projector-type lamps for projecting different beam patterns in high and low beam operational modes.

BACKGROUND

Headlamps, and in particular, projector-type headlamps have been provided for vehicle illumination applications, and their structure is well known in the art. A conventional vehicle headlamp includes a light source and optical components, such as lenses and reflectors to collect and shape light emitted by the light source and to project the resulting beam pattern forward of the vehicle.

It is preferred that a single headlamp system be capable of projecting more than one beam pattern. For example, a headlamp system may project a low beam pattern and a high beam pattern. Such a bifunctional system is conventionally provided by utilizing multiple-filament light sources: one filament for the low beam function, and another for the high beam function. Other conventional bi-functional projector systems utilize a single shutter or light shield to selectively block a portion of the light from a single-filament light source to provide a low beam pattern. To provide a high beam pattern, the shielded light is added to the beam by retraction of the shield.

One limitation of these types of conventional bi-functional projector systems (using single-shield actuation) is that the systems do not achieve unique low and high beam patterns. In the United States, automotive lighting devices are regulated under Federal Motor Vehicle Safety Standard 108 ("FMVSS108"), which specifies, for example, photometric requirements for dual-filament light sources. In order to qualify under FMVSS108 as a dual-filament light source, the low beam pattern and the high beam pattern must be sufficiently distinct. Because conventional bi-functional projector systems provide beam patterns that lack the optimal low to high beam contrast ratio, such systems do not conform to FMVSS108. This has significantly hindered the implementation of bifunctional projector lamp systems that use sources other than HID (e.g., halogen light sources).

In view of the foregoing, there exists a market need for a compact bi-functional projector style headlamp system using a single-filament light source. The novel projector lamp should provide a high contrast ratio between the low and high beams.

BRIEF SUMMARY OF THE INVENTION

According to an aspect of the invention, a vehicle headlamp is provided and comprises a light source, a reflector, and a lens. The reflector is disposed around the light source and collects and reflects light emitted therefrom. The light source and the reflector cooperate to form a light pattern. The lens is positioned forward of the reflector for receiving light emitted by the light source and reflected by the reflector, and for projecting a desired beam pattern from the headlamp.

A light shield is provided and is disposed between the lens and the reflector. The light shield has a first shade and a second shade. The first shade selectively blocks a first portion of the light pattern, to form a first beam pattern, and the second shade selectively blocks a second portion of the light pattern, while the first shade is not blocking the first light pattern portion, to form a second beam pattern. The first shade may be positioned generally below an optical axis of the reflector and the second shade may be positioned generally above the optical axis.

According to an aspect of the invention, the headlamp is a bi-functional headlamp and is configured to selectively provide at least two unique light beam patterns. For example, the first beam pattern may be a low beam pattern and the second beam pattern may be a high beam pattern. The second shade may be configured to block a foreground zone of the high beam pattern, thereby enhancing the contrast ratio between the foreground and the high-intensity region, or "hot zone" of the beam pattern.

The headlamp may further comprise an actuation mechanism, including a solenoid, for moving the first and second shade portions. The actuation mechanism may move the first and the second shade portions simultaneously and in a translatory manner, or a rotational manner.

In another aspect of the invention, the first shade is attached to the second shade and is separated from the second shade by a predetermined distance. Consequently, by moving the first shade into the light pattern, the second shade will be removed from the light pattern. Conversely, moving the second shade portion into the light pattern will cause the first shade portion to be removed from the pattern.

The light source may be any suitable light source, including, but not limited to, an incandescent light source, a halogen light source, a LED light source, and a high intensity discharge ("HID") light source. The reflector may have any shape that is suitable for collecting and reflecting light from the light source, and is preferably ellipsoidal.

According to another aspect of the invention, a bifunctional vehicle headlamp is provided and comprises a light source and a reflector, which cooperate to form a light pattern, a lens positioned forward of the reflector and configured to project a desired beam pattern, and a light shield disposed between the lens and the reflector. The light shield is moveable between a first position, whereby the light shield blocks a first portion of the light pattern to form a low beam pattern, and a second position, whereby the light shield blocks a second portion of the light pattern without blocking the first portion of the light pattern, to form a high beam pattern. The headlamp preferably comprises an actuation mechanism for moving the light shield between the first position and the second position.

When the light shield is in the first position, the shield is preferably configured to block a high light intensity region in the beam pattern. When the light shield is in the second position, the shield is preferably configured to block a foreground zone of the beam pattern. The light shield comprises at least one shade for blocking the first and second portions of the light pattern, and preferably comprises two or more shades.

These and other aspects and advantages of the present invention will become apparent upon reading the following detailed description of the invention in combination with the accompanying drawings.

DETAILED DESCRIPTION OF THE INVENTION

Figure 1A:
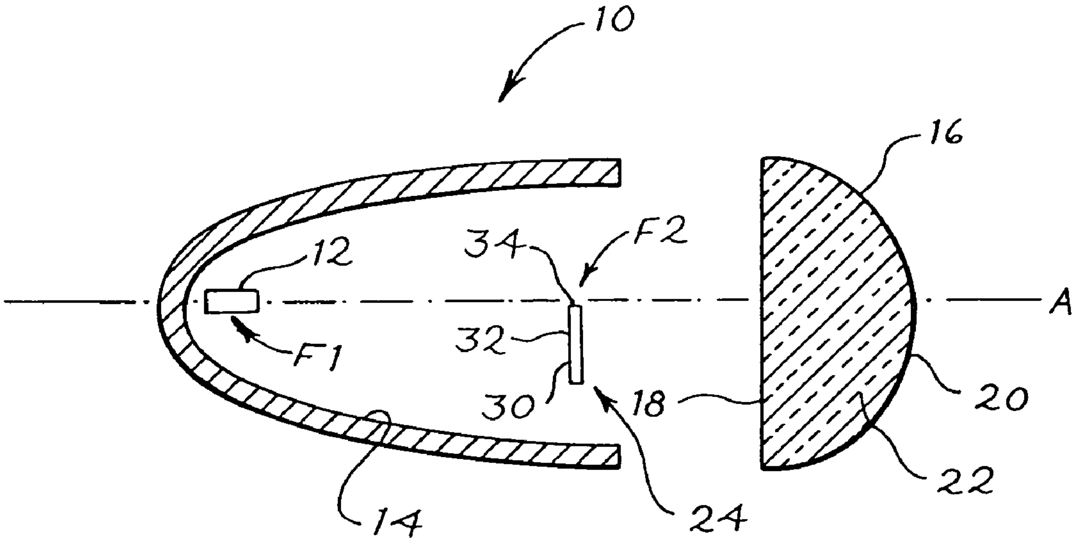
FIG. 1A is a partial cross-sectional view of a projector headlamp system in low beam mode, according to an aspect of the invention.

FIG. 1A illustrates a headlamp 10 according to an aspect of the present invention. The headlamp 10 is a projector-style headlamp and comprises a light source 12, a reflector 14, and a lens 16. The headlamp 10 is bi-functional and is configured to selectively provide at least two unique light beam patterns. For example, the headlamp may be configured to provide a high beam pattern and a low beam pattern.

The light source 12 can be any suitable light source that is configured to emit light over an appropriate light spectrum and at an appropriate intensity, for a particular use. Examples of suitable light sources 12 include, but are not limited to, incandescent, halogen, high intensity discharge ("HID"), and light emitting diode ("LED") light sources. In the embodiment shown in FIG. 1A, the light source 12 is arranged along the optical axis A of the reflector 14 and is disposed generally at a first focal point or plane F1 of the reflector 14.

The reflector 14 may have any shape numerically or otherwise determined to provide the desired light beam pattern, and preferably has an ellipsoidal shape. Reflector 14 is formed so that the light emitted by the light source 12 is reflected by reflector 14 in converging light bundles. Light source 12 and reflector 14 cooperate to form a light pattern at the second focal point or plane F2 of the reflector 14.

The lens 16 is disposed at a predetermined distance from reflector 14. In the embodiment shown in FIG. 1A, lens 16 is formed as a collecting lens and has a first surface 18 and a second surface 20 defined by a body portion 22 therebetween. The lens 16 receives light from the light source 1.2 and the reflector 14 through the first surface 18, transmits the light through the body portion 22, and projects a predetermined beam pattern from the second surface 20. The beam pattern corresponds generally with the light pattern, but is horizontally and vertically inverted with respect to the optical axis A.

The first surface 18 is generally planar and is oriented generally perpendicular to the optical axis A. The second surface 20 has a generally curved contour that may be spherical or aspherical. The contour of the second surface 20 is selected so that light generated by light source 12 and reflected by reflector 14 is deviated during passage through the lens in a predetermined manner. Preferably, the lens 16 is composed of glass, a light permeable synthetic plastic, or any other suitable material.

Figure 1B:
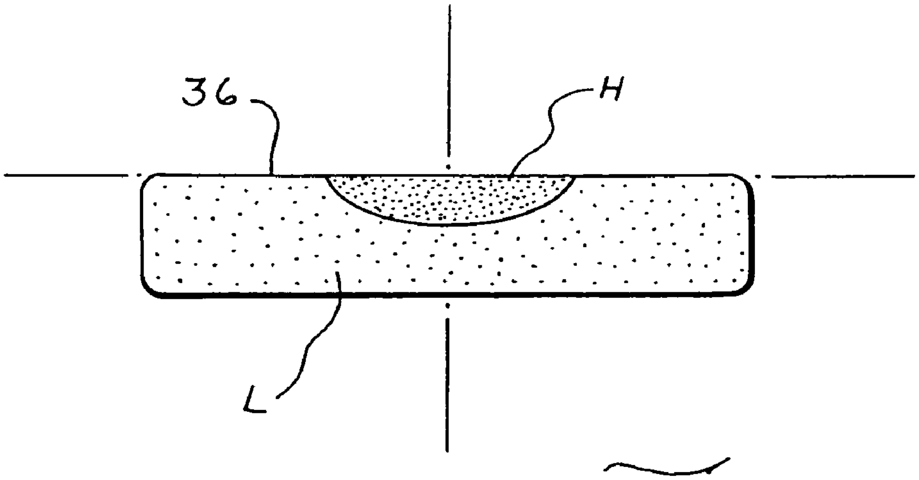
FIG. 1B is a schematic diagram of a low beam pattern produced by the projector system of FIG. 1A.

The headlamp 10 includes a light shield 24 disposed between lens 16 and reflector 14. The light shield 24 comprises a first shade 30 that is moveable between a first position when the headlamp 10 is in a low beam mode, and a second position when the headlamp 10 is in a high beam mode. In FIG. 1A, the headlamp 10 is shown in a low beam mode, wherein a body portion 32 is disposed generally below the optical axis A so that the shade 30 blocks a first portion of the light emitted by the light source 12 and reflected by the reflector 14. The resulting beam pattern, illustrated in FIG. 1B, has a high-intensity light region H and a low-intensity light region L. The upper edge 36 of the beam pattern has a contour that corresponds with the contour of an upper edge 34 of the shade 30.

Figure 2A:
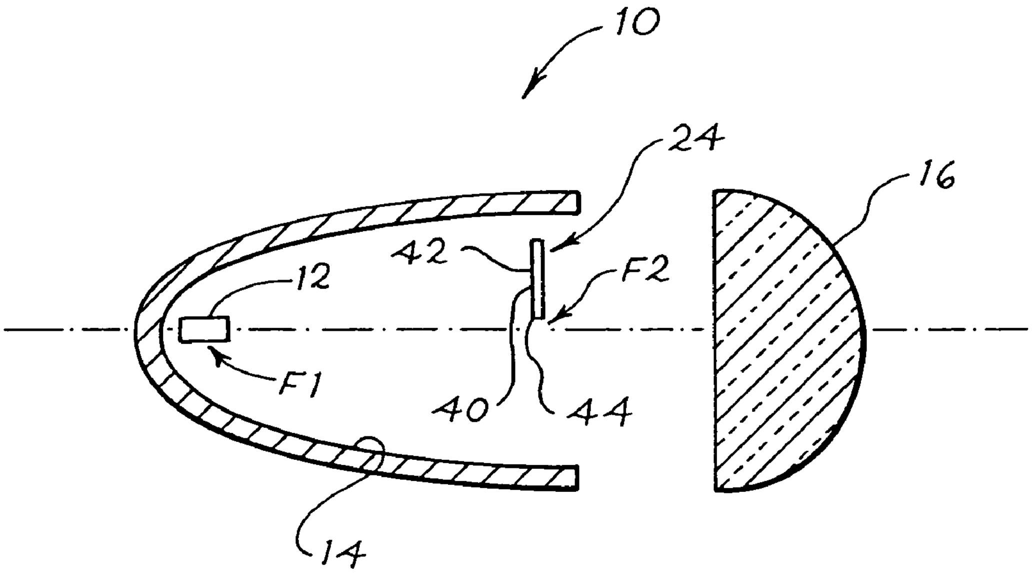
FIG. 2A is a partial cross-sectional view of a projector headlamp system in high beam mode, according to an aspect of the invention.
Figure 2B:
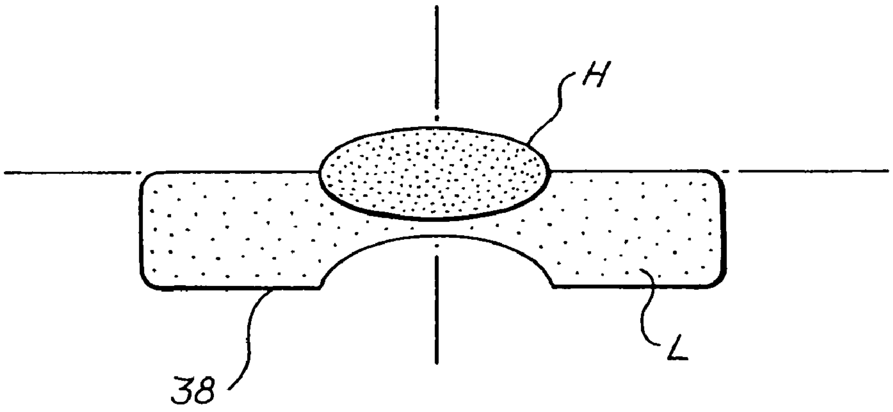
FIG. 2B is a schematic diagram of a high beam pattern produced by the headlamp assembly of FIG. 2A.

In FIG. 2A, the headlamp 10 is shown in a high beam mode. In the high beam mode, the first shade 30 is removed from its position between the light source 12 and the lens 16 so that it no longer blocks the first portion of the light pattern. Accordingly, additional light is added to the beam pattern, extending the high-intensity light region H, or "hot zone," vertically upwards, as shown in FIG. 2B.

At substantially the same time that the first shade 30 is removed, a second shade 40 is moved between the light source 12 and the lens 16, generally above the optical axis A. The shade 40 blocks a second portion of the light emitted by the light source 12 and reflected by the reflector 14, and is configured to remove a portion of the low-intensity light region L, corresponding with the foreground light of the beam pattern. Removal of the foreground portion of the light beam enhances the contrast ratio between the foreground and the hot zone of the beam pattern. This may improve the driver's ability to view the road in the high beam mode, as the driver will tend to focus on the high-intensity portion of the light beam, with less interference from the lower-intensity foreground zone. In FIG. 2B, the lower edge 38 of the beam pattern has a contour that corresponds with the contour of a lower edge 44 of the shade 40.

Figure 3A:
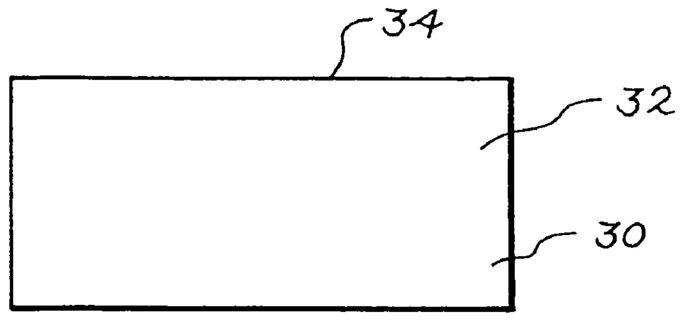
FIGS. 3A, 3B, and 4 are schematic views of various components of shield mechanisms.
Figure 3B:
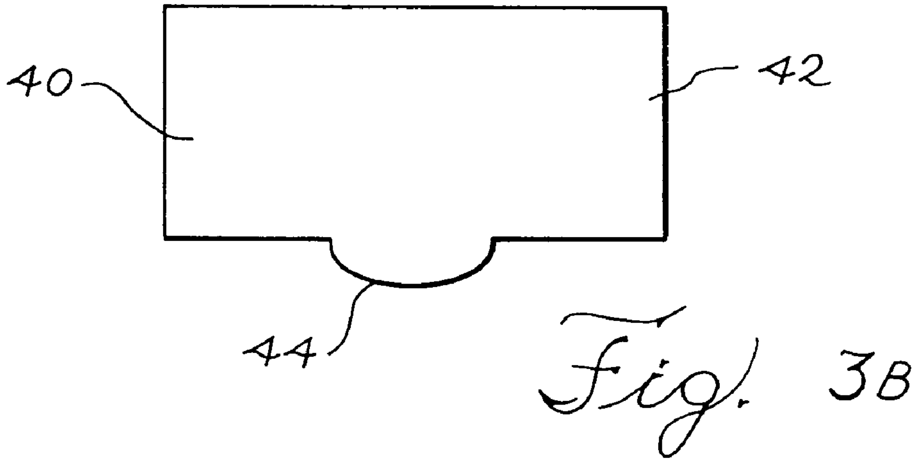

FIGS. 3A and 3B show the various shades of the light shield 24. In FIG. 3A, a first shade 30 is provided for blocking light in the low beam mode. In the low beam mode, shade 30 is positioned so that an upper edge 34 of the body portion 32 blocks a portion of the light pattern generally below the optical axis. In FIG. 3B, a second shade 40 is provided for blocking light in the high beam mode. In the high beam mode, the shade 40 is positioned so that a lower edge 44 of the body portion 42 blocks a portion of the light pattern generally above the optical axis.

Figure 4:
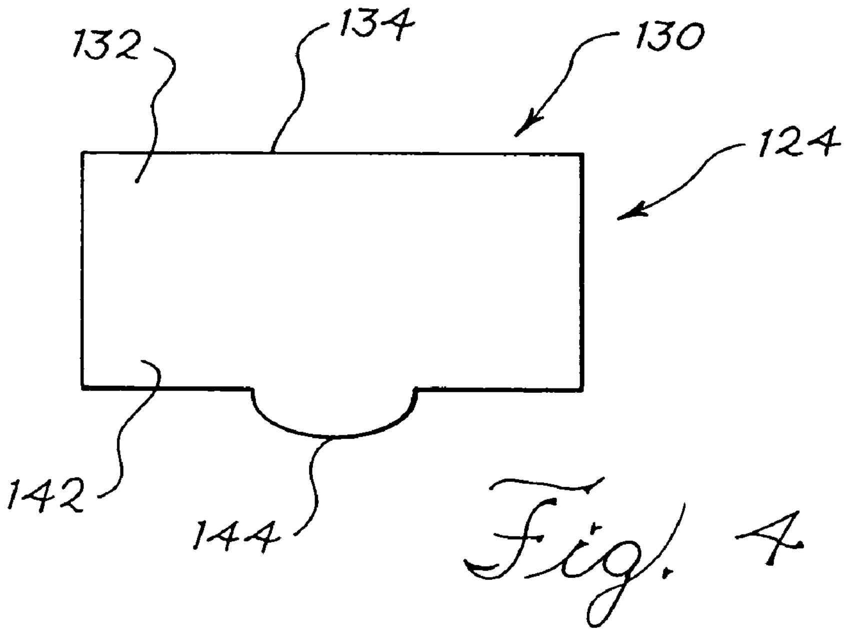

FIG. 4 illustrates another light shield 124 that may be used with the present invention. The light shield 124 comprises a shade 130 for blocking light in the low beam mode and in the high beam mode. In the low beam mode, the shade 130 will be positioned so that an upper portion 132 of the shade blocks a first portion of the light pattern generally below the optical axis. The upper edge of the resulting beam pattern will have a contour that corresponds with the contour of an upper edge 134 of the shade. In the high beam mode, the shade 130 will be positioned so that a lower portion 142 of the shade blocks a second portion of the light pattern generally above the optical axis. The lower edge of the resulting beam pattern will have a contour that corresponds with the contour of a lower edge 144 of the shade. It will be apparent that in the high beam mode, the shade 130 will be positioned so that it does not block the first portion of the light pattern.

Figure 5:
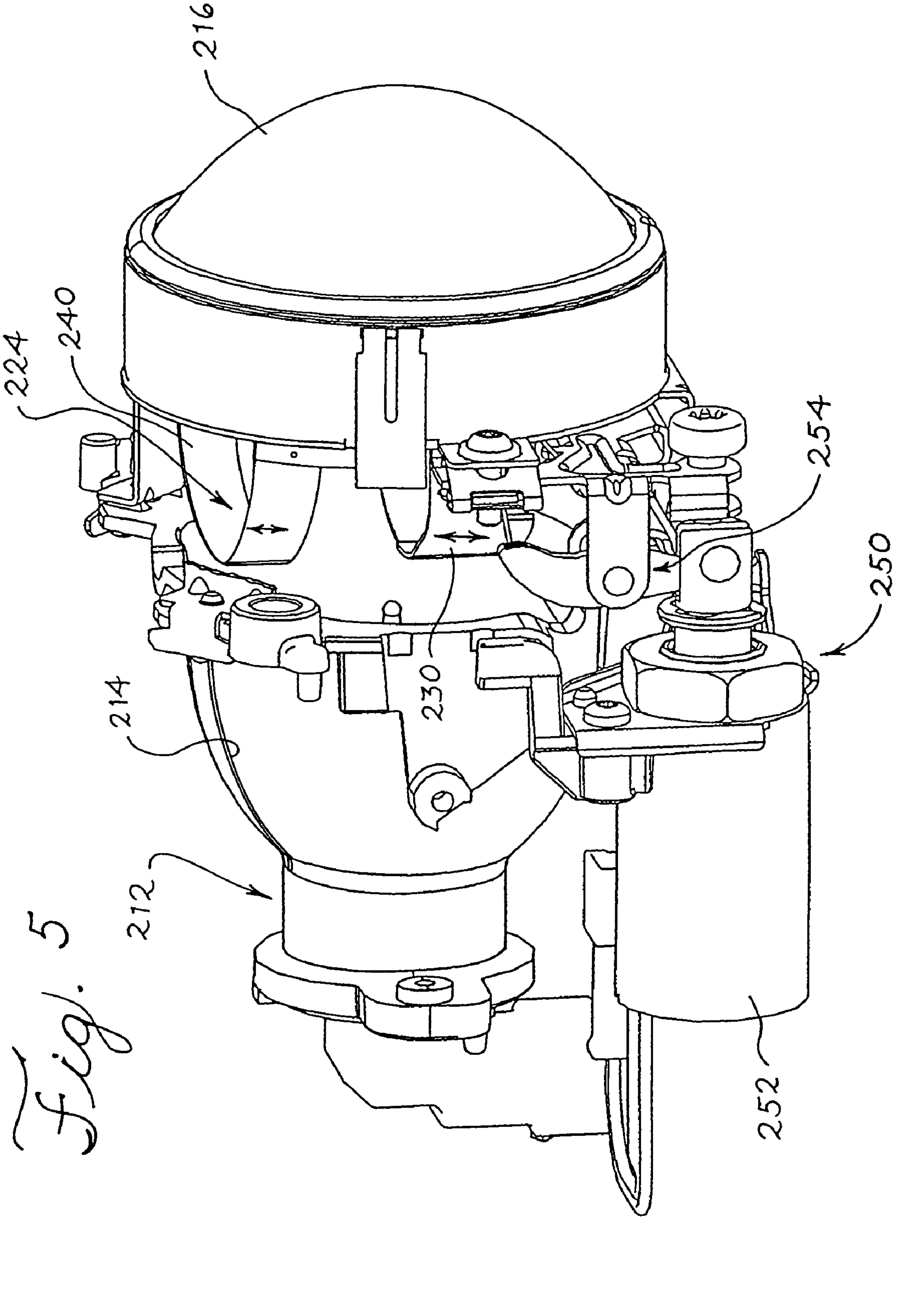
FIGS. 5 and 6 show side perspective views of various projector systems configured, in accordance with several embodiments of the present invention.

FIG. 5 shows a perspective view of a headlamp 210 according to an aspect of the invention. The headlamp 210 has a light source 212, a reflector 214, a lens 216, and a light shield 224, which includes a first shade 230 and a second shade 240. The headlamp 310 further comprises an actuation mechanism 250, which is configured to move the first and second shades 230, 240 between their respective low beam and high beam mode positions. The headlamp 210 is in electrical communication with a control device (not shown) that allows the user to selectively actuate the shades 230, 240 between high beam and low beam modes.

The actuation mechanism 250 preferably comprises a solenoid 252 that is in mechanical communication with the shades 230, 240 via conversion mechanism 254. When the solenoid 252 is in a first position, the light shield 224 is configured so that the first shade 230 blocks a first portion of the light pattern generally below the optical axis, and the headlamp 210 produces a low beam pattern. When the solenoid 252 is in a second position, the light shield 224 is configured so that the first shade 230 is removed from the first portion of the light pattern and so that the second shade 240 blocks a second portion of the light pattern generally above the optical axis. Accordingly, the headlamp 210 produces a high beam pattern.

The actuation mechanism 250 may move the shades 230, 240 independently of each other. Preferably, the first shield 230 and the second shield 240 will move generally simultaneously. For example, in one embodiment of the present invention, the first and second shields 230, 240 may be affixed or may be formed as a single piece. In such an instance, the first shield 230 is attached at a predefined distance from second shield 240 such that a movement of shield 230 out of the light pattern causes movement of second shield 240 into the light pattern.

In FIG. 5, the actuation mechanism 250 is configured to move the shades 230, 240 simultaneously and in a translatory manner. When the high beam function is selected, the shades 230, 240 translate downwardly with respect to the optical axis so that the shade 230 is removed from the light pattern and the shade 240 blocks the light pattern. When the low beam function is subsequently selected, the shades 230, 240 translate upwardly with respect to the optical axis so that the shade 240 is removed from the light pattern and the shade 230 blocks the light pattern.

Figure 6:
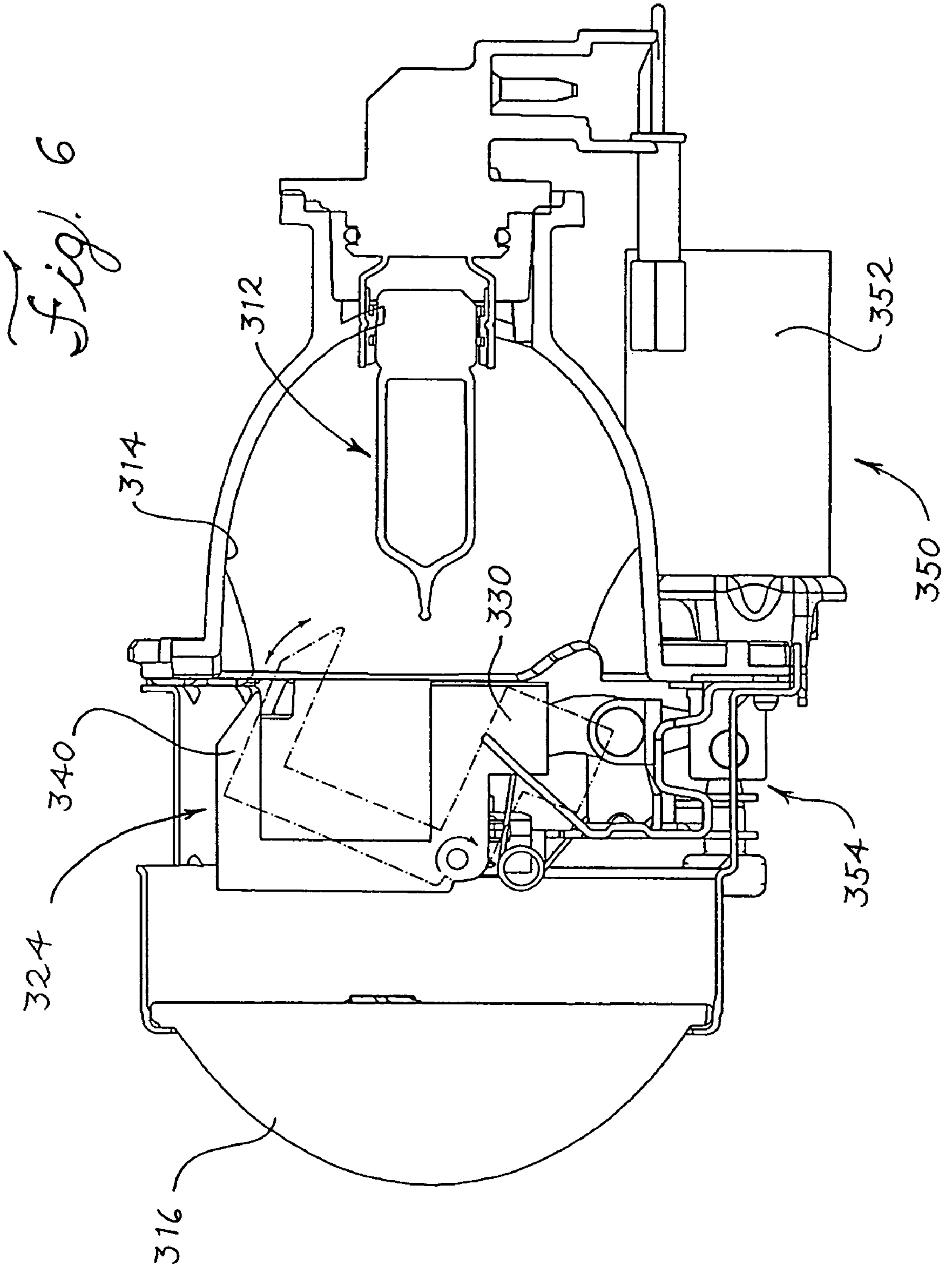

In FIG. 6, the actuation mechanism 350 is configured to move the shades 330, 340 in a rotational manner. When the high beam function is selected, the shade 340 rotates along an arc into the light pattern and the shade 330 rotates along an arc out of the light pattern. When the low beam function is subsequently selected, the shade 330 rotates into the light pattern and the shade 340 rotates out of the light pattern.

Throughout this specification, various indications have been given as to preferred and alternative embodiments of the invention. However, it should be understood that the invention is not limited to any one of these. It is therefore intended that the foregoing detailed description be regarded as illustrative rather than limiting, and that it be understood that it is the appended claims, including all equivalents, that are intended to define the spirit and scope of this invention.

The invention claimed is:

1. A bi-functional vehicle headlamp comprising:

a light source;

a reflector disposed around the light source for collecting and reflecting light emitted from the light source, the light source and the reflector cooperating to form a light pattern;

a lens positioned forward of the reflector for receiving light emitted by the light source and reflected by the reflector, and for projecting a desired beam pattern from the headlamp; and a light shield disposed between the lens and the reflector, the shield having a first shade that selectively blocks a first portion of the light pattern and a second shade that selectively blocks a second portion of the light pattern, where the first shade selectively blocks the first portion of the light pattern while the second shade is not blocking the second portion of the light pattern to form a low beam pattern, and the second shade selectively blocks a second portion of the light pattern while the first shade is not blocking any portion of the light pattern, to form a high beam pattern.

2. The headlamp of claim 1, further comprising an actuation mechanism for moving the first and second shades.

3. The headlamp of claim 2, wherein the actuation mechanism comprises a solenoid.

4. The headlamp of claim 2, wherein the actuation mechanism moves the first and second shades simultaneously.

5. The headlamp of claim 2, wherein the actuation mechanism moves the first and second shades in a translatory manner.

6. The headlamp of claim 2, wherein the actuation mechanism moves the first and second shades in a rotational manner.

7. The headlamp of claim 1, wherein the second shade is configured to block a foreground zone of the high beam pattern.

8. The headlamp of claim 1, wherein the first shade is positioned generally below an optical axis of the reflector, and wherein the second shade is positioned generally above the optical axis.

9. The headlamp of claim 1, wherein the reflector has an ellipsoidal shape.

10. The headlamp of claim 1, wherein the light source is an incandescent light source.

11. The headlamp of claim 1, wherein the light source is a LED light source.

12. The headlamp of claim 1, wherein the light source is a halogen light source.

13. The headlamp of claim 1, wherein the lens is a condenser lens.

14. The headlamp of claim 1, wherein the first shade selectively blocks a high-intensity portion of the light pattern to form the low beam pattern and the second shade selectively blocks a low-intensity portion of the light pattern to form the high beam pattern.

15. The headlamp of claim 1, wherein the second shade is positioned generally above an optical axis of the reflector to form the high beam pattern.

16. The headlamp of claim 1, wherein the light pattern is formed at a focal point or plane of the reflector.

* * * * *